(No Model.)
J. HAMER.
CLOSED WELL.
No. 369,056. Patented Aug. 30, 1887.
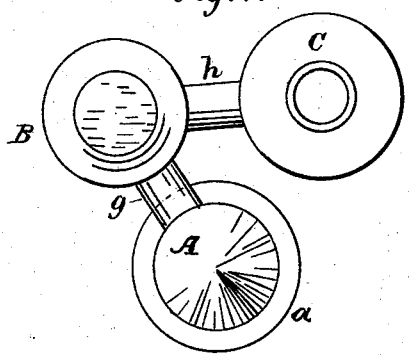
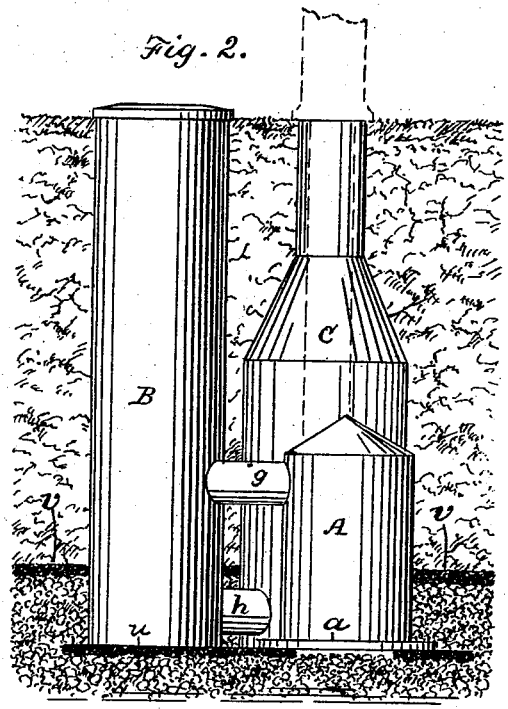
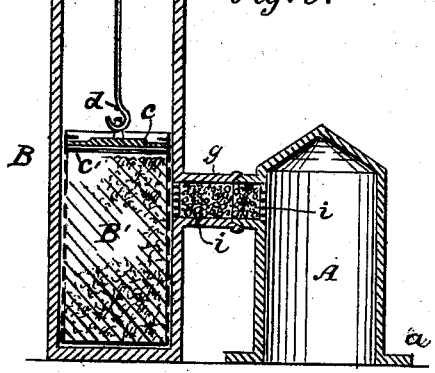
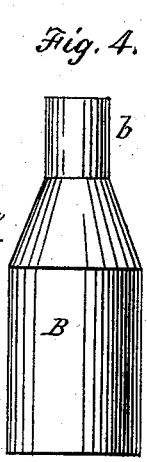
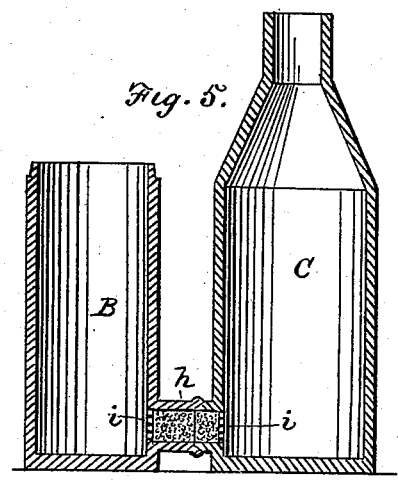
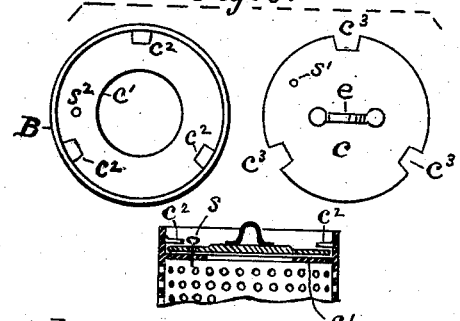
Witnesses:
Chas Bendheim
E. C. D. Sutron
Inventor:
John Hamer
By Alex D. Sutron
Attorney.

UNITED STATES PATENT OFFICE.

JOHN HAMER, OF HOOVERSVILLE, PENNSYLVANIA.

CLOSED WELL.

SPECIFICATION forming part of Letters Patent No. 369,056, dated August 30, 1887.

Application filed September 20, 1886. Serial No. 214,028. (No model.)

*To all whom it may concern:*

Be it known that I, JOHN HAMER, a citizen of the United States, residing at Hooversville, in the county of Somerset and State of Pennsylvania, have invented certain new and useful Improvements in Closed Wells, of which the following is a specification, reference being had therein to the accompanying drawings.

Figure 1 is a plan view of the water receiving, filtering, and reservoir chambers. Fig. 2 represents my devices in side view. Fig. 3 is a vertical section of the water-chamber A and filtering-chamber B. Fig. 4 shows a modification of the filtering apparatus. Fig. 5 illustrates in section the filtering and supply chambers. Fig. 6 illustrates the perforated receiver for filtering materials.

The object of this invention is to so construct and inclose a well that water may be obtained from any desired stratum to the exclusion of water of all other strata and surface water; also, to exclude vermin and all noxious animal or vegetable matter, and deliver the water, filtered or medicated, as desired, to a supply-chamber, from which it may be obtained in a pure condition.

In carrying out my invention I use three cylindrical vessels placed around a common center—a receiving-chamber open at the bottom, a closed filtering and medicating chamber, and a closed supply-chamber communicating with the surface of the ground and adapted to receive a pump or other apparatus for drawing water, tubular connections between such chambers being provided for the passage of water, and the filtering-chamber also having communication with the surface and being provided with a removable perforated receiver for filtering and medicating matter.

The device is sunken to the subterranean stratum desired, provided with a firm foundation, and inclosed with cement or other material, as hereinafter more fully set forth.

A designates a cylindrical water-receptacle, which is open at the bottom and closed at the top, said cylinder A being provided with a flange, $a$, so that it will stand firmly in place.

B indicates a filtering-chamber with closed bottom, and having a vertical extension upward for communication from above. This chamber may be of uniform diameter throughout, or may have a reducer and tube, $b$, extending to the surface of the ground, as seen in Fig. 4. Within said chamber B is placed a perforated receiver, B', for containing any suitable filtering and mineral or other medicating materials, said receiver having a removable cover, $c$. The receiver and cover are so constructed that by means of a rod, D, provided with a hook, $d$, the receiver and contents may be drawn up from chamber B. A person desiring to take out the receiver hooks the rod in an eye, $e$, on the cover and then draws it up. The mouth of the receiver has a flange, $c'$, above which are projections $c^2$, and the cover $c$ is provided with notches $c^3$. When the receiver is closed, the cover $c$ rests upon the flange $c'$, with its edge extending under the projections $c^2$, and is secured by a pin, $s$, passed through a hole, $s'$, in the cover and a corresponding aperture, $s^2$, in the flange.

To remove the cover $c$, remove the pin $s$ and turn the cover, so that the notches $c^3$ are directly below projections $c^2$, when the cover may be lifted from the receiver, and by these means the receiver may be drawn out for the purpose of removing or emptying its contents.

C is a supply-chamber, which is closed at the bottom and has a vertical extension from the top for connection with a pump or other suitable apparatus for drawing water. A tubular connection, $g$, forms communication between the upper part of chamber A and filtering-chamber B, and a tubular connection, $h$, forms a water-passage from the chamber B to supply-chamber C, between the lower parts of said chambers. Strainers $i$ are formed at each end of the tubular connections, usually by perforating the casing of the cylinders, and the tubular connections are filled with gravel to prevent any particles of filtering matter from entering the supply-chamber.

Chamber A, I place in the subterranean strata of water, that the water in said strata and in the chamber may be at rest, thereby avoiding all wash in the strata, and therefore no dirt, mud, or other foreign matter can accumulate. The outlet being at top of said chamber, forbids the water to be pumped from or molested in said chamber; but as a hidden fountain it naturally feeds chamber B, as required.

I sink the excavation to the strata of water desired and properly arrange stone or firebrick, or fill in finely-broken stone or creek gravel (say eight to twelve inches) firmly put down and leveled, making a bed of cement, $u$, on said foundation for the flange of chamber A and the bottoms of chambers B and C to rest upon, care being taken that the water can freely enter the bottom of the chamber A. I then fill around the device with finely-broken stone (say twelve inches, if one strata of water is desired, and if a head or more strata of water is desired, fill higher) and place thereon a heavy layer of cement, $v$, that no dirt can come among the stones. I then fill the well to the top with the dirt taken from the excavation, thereby avoiding the expense of walling in wells, and also serving the purpose of keeping the water cool and fresh. This device, if made entirely of fire-clay properly burned and vitrified, will last for ages. I prefer this, as it is economical and free from odor or taint, though it may be constructed of other material, such as glass, galvanized iron, &c.

I am aware that other filters for water have been used; but said filters are different in make and operation, and are and can be only used after the waters of the several strata have become mixed and befouled by decaying animal, vegetable, and other poisonous matter, while my device prevents said waters from becoming befouled, as aforesaid, as well as filters and medicates the same.

Having described my invention, I claim and desire to secure by Letters Patent—

A water-chamber closed at the top and open at the bottom, sunk to a stratum of water which is provided with a covering of cement, in combination with a filtering-chamber having an extension to the surface of the ground and a supply-chamber adapted for any suitable means for drawing water, substantially as set forth and described.

In testimony whereof I affix my signature in presence of two witnesses.

JOHN HAMER.

Witnesses:
JOHN REEL,
JOHN H. STAHL.